United States Patent [19]

Bastioli et al.

[11] Patent Number: 5,462,981

[45] Date of Patent: Oct. 31, 1995

[54] METHOD OF PRODUCING PLASTICISED POLYVINYL ALCOHOL AND ITS USE FOR THE PREPARATION OF STARCH-BASED, BIODEGRADABLE THERMOPLASTIC COMPOSITIONS

[75] Inventors: Catia Bastioli, Novara; Vittorio Bellotti, Fontaneto D'Agogna; Gianfranco Del Tredici, Sesto Calende; Roberto Ponti, Oleggio, all of Italy

[73] Assignee: Novamont S.p.A., Milan, Italy

[21] Appl. No.: 280,150

[22] Filed: Jul. 25, 1994

Related U.S. Application Data

[63] Continuation of Ser. No. 970,078, Nov. 2, 1992, abandoned.

[30] Foreign Application Priority Data

Nov. 7, 1991 [IT] Italy ................... TO91A0849

[51] Int. Cl.⁶ ................ C08L 3/02; C08L 29/04
[52] U.S. Cl. ................ 524/47; 524/52; 524/53; 524/380; 524/386; 524/387; 524/388; 524/389; 524/503; 524/557; 524/524; 524/528
[58] Field of Search ................ 524/52, 53, 47, 524/503, 524, 528, 557, 380, 386

[56] References Cited

U.S. PATENT DOCUMENTS

| 3,312,641 | 4/1967 | Young ................... 524/47 |
| 3,316,190 | 4/1967 | Suzumura et al. ......... 524/48 |
| 3,472,804 | 10/1969 | Nobile et al. ........... 524/47 |
| 3,949,145 | 4/1976 | Otey et al. .............. 525/52 |
| 4,542,178 | 9/1985 | Zimmerman et al. ........ 524/388 |

FOREIGN PATENT DOCUMENTS

| 0327505 | 8/1989 | European Pat. Off. ....... 524/52 |
| 0400532 | 5/1990 | European Pat. Off. . |
| 825552 | 7/1938 | France . |
| 2275517 | 1/1976 | France . |
| WO90/10671 | 9/1990 | WIPO . |
| WO91/02024 | 2/1991 | WIPO . |
| WO91/02025 | 2/1991 | WIPO . |

OTHER PUBLICATIONS

Notification of Transmittal of the International Search Report or the Declaration dated Mar. 15, 1993.
International Search Report of PCT/EP92/02517.

*Primary Examiner*—Mark Sweet
*Attorney, Agent, or Firm*—Bryan Cave

[57] ABSTRACT

The method of producing plasticized polyvinyl alcohol by mixing polyvinyl alcohol in the presence of an organic plasticizer and water in a quantity which is insufficient to dissolve the polyvinyl alcohol under normal conditions, includes the steps of:

i) pre-plasticizing the polyvinyl alcohol at a maximum temperature no higher than its softening point so as to produce a pre-plasticized polyvinyl alcohol having a melting point below the softening point of the polyvinyl alcohol used, and ii) further processing the pre-plasticized polyvinyl alcohol thus produced at a temperature above its melting point, under shear-stress conditions and for a period of time to produce a substantially homogeneous melt.

8 Claims, No Drawings

METHOD OF PRODUCING PLASTICISED POLYVINYL ALCOHOL AND IT USE FOR THE PREPARATION OF STARCH-BASED, BIODEGRADABLE THERMOPLASTIC COMPOSITIONS

This is a continuation of U.S. application Ser. No. 07/970,078, filed Nov. 2, 1992 now abandoned.

The present invention relates to a method of producing plasticized polyvinyl alcohol and to its use in processes for the preparation of thermoplastic polymeric compositions which include starch and polyvinyl alcohol and are suitable for the production of films and molded or extruded articles having good biodegradability characteristics.

The production of films based on starch and polyvinyl alcohol by casting and simple extrusion processes is known.

In this connection, U.S. Pat. No. 3,316,190 is directed towards the production of non-cling, water-soluble films by the casting of an aqueous solution containing polyvinyl alcohol, starch and a surfactant.

U.S. Pat. No. 3,472,804 describes the production of films which are insoluble in water by the casting of compositions including polyvinyl alcohol of high or medium molecular weight, starch or, preferably, dextrin, polymerizable derivatives of formaldehyde, more precisely, urea-formaldehyde or phenol-melamine reaction products, and a plasticizer.

U.S. Pat. No. 3,949,145 describes the production of biodegradable films useful as mulching by the casting of aqueous solutions of polyvinyl alcohol, starch and glycerine. The water-resistance of these films is improved by a water-resistant polymeric coating.

U.S. Pat. No. 3,312,641 describes the use of polyvinyl alcohol as a plasticizer for amylose or starches with amylose contents of more than 50%. The compositions are converted into films by casting or by simple extrusion with the use of an extruder with a filming orifice.

It will be appreciated that the production techniques described above are expensive and not very suitable for large-scale industrial production.

Film-forming, biodegradable polymeric compositions including starch and thermoplastic polymers which are insoluble, or relatively insoluble, in water, possibly in combination with hydrophilic polymers which are soluble in water, have recently been described. These compositions enable films and molded articles with improved mechanical characteristics to be produced by processes which are conventional in relation to thermoplastic materials. In this connection, EP-A-0 400 532 describes compositions including starch and an ethylene-vinyl alcohol copolymer which may include up to 15% by weight of polyvinyl alcohol with reference to the total weight of the composition, and a plasticizer. These compositions are prepared by blending the components in the presence of a limited water content and/or of a plasticizer preferably in an extruder heated to a temperature to form a thermoplastic melt. In the compositions of the patent application cited above, the use of polyvinyl alcohol in combination with starch and with the polymer which is insoluble or relatively insoluble in water, enables the water-resistance of the articles to be modulated according to the use for which the articles are intended. Thus, for example, the use of polyvinyl alcohol is desirable for the production of articles disposable in water ("flushable" articles), such as sanitary articles, in particular.

The difficulties connected with the thermoplastic processing of polyvinyl alcohol, which has a high melting point and is subject to thermal decomposition below its softening point, however, are known. The need to reduce the softening point of polyvinyl alcohol intended for thermoplastic processing is thus known. U.S. Pat. No. 4,542,178 describes a method of producing polyvinyl alcohol granules which contain a plasticizer and are suitable for thermoplastic processing, the method requiring the use of granular polyvinyl alcohol of a particular particle size. The plasticizing method provides for the granular polyvinyl alcohol to be mixed in the presence of a quantity of water which is insufficient to dissolve the polyvinyl alcohol, and of a plasticiser, in a mixer with forced circulation (a turbomixer). The method is carried out by subjecting the polyvinyl alcohol to a heating cycle in which its temperature is raised to a value no higher than 140° C. and is then reduced to a value of about 40°–70° C. so as to cause the bulking of the particles, their temporary agglomeration, and the subsequent disintegration of the agglomerations. In a preferred embodiment, the granular polyvinyl alcohol is mixed in the presence of a compound which has a high molecular weight and is soluble or dispersible in water, such as starch or cellulose derivatives. The plasticized granular polyvinyl alcohol thus produced can be subjected to thermoplastic processing by conventional injection-molding or extrusion processes for producing shaped articles and films.

The tests carried out by the Applicant have shown, however, that the granular polyvinyl alcohol produced according to the technology of U.S. Pat. No. 4,542,178 is not suitable for use in starch formulations including a synthetic thermoplastic polymer which is insoluble or relatively insoluble in water, such as those described in patent application EP-A-400,532, since films produced by the extrusion and blowing of such formulations have many large non-fused lumps of polyvinyl alcohol which adversely affect their physical-mechanical characteristics.

An object of the present invention is therefore to provide a new method of plasticizing polyvinyl alcohol so as to provide a pre-plasticized polyvinyl alcohol which is suitable for thermoplastic processing and, in particular, is suitable for incorporation in starchy formulations including thermoplastic polymers which are insoluble or relatively insoluble in water.

For this purpose, a subject of the invention is a method of producing plasticized polyvinyl alcohol by mixing polyvinyl alcohol in the presence of an organic plasticizer and water in a quantity which is insufficient to dissolve the polyvinyl alcohol under normal conditions, characterized in that it includes the steps of:

pre-plasticizing the polyvinyl alcohol at a maximum temperature no higher than its softening point so as to produce a pre-plasticized polyvinyl alcohol having a melting point below the softening point of the polyvinyl alcohol used, and further processing the pre-plasticized polyvinyl alcohol thus produced at a temperature above its melting point under shear-stress conditions and for a period of time such as to produce a substantially homogeneous melt.

The polyvinyl alcohol used in the method of the invention is prepared, in known manner, by saponification, preferably by the hydrolysis of polyvinyl esters, preferably polyvinyl acetate, and has the following characteristics:

molecular weight: 50,000–120,000 degree of hydrolysis: 60–99%, preferably 75–98%.

The method of the invention is preferably carried out with the use of an extruder, the chamber of which has at least two regions in which the temperature is controlled. The first plasticizing step of the method can thus be carried out in one or more regions of an extruder in which the temperature is controlled so that the material supplied is kept at a temperature no higher than 200° C., preferably from 60° to 180° C., and in which the screw has a transportation and plasticizing profile. The second step of the method is carried out in one or more regions of the extruder in which the temperature is kept above the melting point of the pre-plasticized polyvinyl alcohol produced in the first region of the extruder. Typically, in the second step of the method, the temperature is above 140° C. and generally between 140° and 210° C.

In this embodiment of the method, it is preferable to use an extruder with two screws which ensures higher shear-stress values than a single-screw extruder.

In the second mixing step which is carried out at a temperature above the melting point, the time spent in the extruder is typically within a range of from 30 to 500 seconds, with the application of a shear stress to produce a substantially homogeneous melt. The temperature of the melt is then preferably reduced and, at the nozzle, the melt is kept at a temperature generally no higher than 170° C.

The melt can be extruded in rod form and cooled in air or may be supplied directly to an extruder for blow-extrusion.

In the course of the process which takes place in the extruder, the water content may be reduced by degassing upstream of the extrusion orifice, preferably during the second plasticizing step, to obtain a water content in the melt generally of between 5 and 20% by weight.

If the method is carried out in a single- or double-screw extruder, the polyvinyl alcohol supplied may be in the form of granules, flakes, or powder.

Alternatively, the pre-plasticizing step i) may be carried out under mixing conditions typical of a slow mixer with the use of flaked or powdered polyvinyl alcohol (PVA) or under the mixing conditions of a fast mixer (a turbomixer), particularly if flaked PVA is used; in these cases the maximum temperature in the slow mixer or in the turbomixer does not exceed 140° C.

The pre-plasticized product is then subjected to the second mixing step described above in a double-screw or single-screw extruder.

The concentration of the organic plasticizer is generally within the range of from 5 to 50 parts by weight, preferably 15–40%, with reference to the weight of the polyvinyl alcohol. The preferred plasticizers include aliphatic polyols and their acetates, ethoxylate and propoxylate derivatives, particularly glycerine, ethylene or propylene glycol, ethylene or propylene diglycol, ethylene or propylene triglycol, polyethylene glycol, polypropylene glycol, 1,2-propandiol, 1,3-propandiol, 1,2-, 1,3-, 1,4-butandiol, 1,5-pentandiol, 1,6-, 1,5-hexandiol, 1,2,6-, 1,3,5-hexantriol, neopentyl glycol, trimethylol propane, pentaerythritol, sorbitol and the acetate, ethoxylate and propoxylate derivatives thereof, particularly sorbitol ethoxylate, pentaerythritol ethoxylate, sorbitol acetate, and pentaerythritol acetate. A mixture of several plasticizers may be used.

The water concentration is generally between 2 and 40% by weight, preferably from 15 to 40% by weight, with reference to the polyvinyl alcohol.

The polyvinyl alcohol produced by the method of the invention has a melting point of between 110° and 160° C., preferably between 120° and 140° C., and is particularly suitable for the preparation of film-forming compositions including starch and polyvinyl alcohol, or starch, polyvinyl alcohol and one or more synthetic thermoplastic polymers which are insoluble or relatively insoluble in water.

The methods of producing the aforementioned compositions with the use of plasticized polyvinyl alcohol according to the method described above constitute further subjects of the invention.

Polymeric compositions including starch and a synthetic thermoplastic polymer which can be transformed into shaped articles or films are described in patent applications WO90/10671, WO91/02025, WO91/2024 and EP-A-0 400 532.

In the present description, thermoplastic polymers which are insoluble or relatively insoluble in water means polymers and copolymers which absorb no more than 15% by weight of water at 20° C. and at equilibrium. Preferred polymers are polymers and copolymers which are derived from ethylenically unsaturated monomers and which have repeating units with at least one polar functional group such as a hydroxy, alkoxy, carboxy, carboxyalkyl, alkylcarboxy or acetal group. Preferred polymers include copolymers of an olefin selected from ethylene, propylene, isobutene and styrene with acrylic acid, vinyl alcohol and/or vinyl acetate. These olefin copolymers include, in particular, ethylene copolymers such as ethylene-acrylic acid, ethylene-vinyl alcohol, ethylene-vinyl acetate and mixtures thereof. Particularly preferred are ethylene-vinyl alcohol copolymers with ethylene contents of from 10 to 44% by weight, produced by the hydrolysis of the corresponding ethylene-vinyl acetate generally with a degree of hydrolysis of between 50 and 100%.

The synthetic polymeric component may also include epsilon-polycaprolactone and copolymers thereof, polyhydroxybutyrate/valerate and polymers and copolymers of lactic acid with glycolic acid or caprolactone.

The starch used in these polymeric compositions is preferably a native starch, particularly maize or potato starch. The term "native" includes starches with high amylose contents and "waxy" starches. It is, however, possible to use physically and chemically modified starches such as starch ethoxylates, starch acetates, cationic starches, oxidized starches and cross-linked starches. The native starch is normally used in the preparation of the formulations without being dried beforehand and has an intrinsic water content of about 9–15% by weight.

The method of preparation with the use of plasticized polyvinyl alcohol does not differ substantially from known methods already described in the patent literature cited above. In fact, the compositions are prepared by mixing the components in an extruder which is heated to a temperature sufficient to produce a thermoplastic melt. In addition to the plasticizer present in the polyvinyl alcohol, the composition supplied to the extruder may include a further quantity of plasticizer useful for plasticizing the starch and any synthetic thermoplastic polymer used. Generally, the total quantity of plasticizer is between 1 and 50% by weight, preferably between 5% and 25% by weight, with reference to the weight of the total composition.

The plasticizers used may be the same plasticizers which are used in the preliminary plasticizing of the polyvinyl alcohol, or a mixture thereof.

A total quantity of up to 40% by weight of water, with reference to the starch-water system, may be added to the composition supplied to the extruder; however, in the presence of a high-boiling plasticizer, the intrinsic water content present in the starch used is sufficient per se to cause the formation, under the process conditions, of a thermoplastic melt in which starch, synthetic polymer and polyvinyl alcohol are interpenetrated at the molecular level.

The material supplied to the extruder may also include agents, such as urea, which can destroy the hydrogen bonds, and of which a quantity of 0.5 to 20% by weight, preferably between 2 and 75% by weight with reference to the total composition, can be added to the mixture of starch and polymers.

The polymeric material may also include cross-linking agents, such as aldehydes, ketones and glyoxals, process coadjuvants, release agents, and lubricants, such as fatty acids, esters of fatty acids, higher alcohols and polyethylene waxes which are normally incorporated in molding and extrusion compositions, antioxidants, opacifiers and stabilizers.

Small quantities, generally no greater than 5% by weight, with reference to the weight of the total composition, of hydrophobic polymers such as polyethylene, polypropylene, polystyrene may also be included in the formulations.

The pressures to which the mixture of the components cited above is subjected during the heat treatment are those typical for extrusion in a single or double-screw extruder. However, although the process is preferably carried out in an extruder, the mixing may be effected in any device which ensures temperature and shear-stress conditions sufficient to render the starch and the polymeric fraction compatible from a rheological point of view. The preferred method of preparing the compositions with the use of the plasticized polyvinyl alcohol includes the steps of:

- bulking the starch and the synthetic polymer by means of the plasticizer available and possibly the water present, at a temperature of between 80° and 180° C.; this effect may be achieved, for example, during a first stage of the transportation of the components through an extruder, for a period of time of the order of from 2 to 50 seconds,
- subjecting the mixture to shear-stress conditions corresponding to similar viscosity values of the polymeric and starchy components so as to favour the interpenetration of the molecules of the components,
- degassing the mixture freely, under controlled pressure conditions or under vacuum, to produce a melt at a temperature of from 135° to 180° C. with a water content such that bubbles are not created at atmospheric pressure, that is, for example, at the output of the extruder.

The melt may then be extruded directly in the form of a film with the use of an extruder with a blowing head, or may be extruded and transformed into pellets for subsequent processing by conventional extrusion, extrusion and blowing, or injection molding techniques.

The preferred compositions include polyvinyl alcohol plasticized according to the invention including the following percentages by weight of the components:

starch (anhydrous): 20–70%, preferably 30–60%, total synthetic polymer: 5–50%, preferably 20–40%.

total plasticizers: 5–25%, urea: 0–7%, preferably 2–5%, water (extruded, not conditioned): 2–6%.

The polyvinyl alcohol generally constitutes from 10 to 100% and preferably from 20 to 50% by weight of the total synthetic polymeric component. As an absolute value, the concentration of the polyvinyl alcohol in the compositions is preferably between 2 and 25% by weight.

EXAMPLES 1–3

A) Plasticizing in a double-screw extruder.

The polyvinyl alcohol (referred to as PVA below) was plasticized with the use of an extruder Model EPV 60/36D with two contrarotating screws and 9 heating zones in which the following heating profile was established:

60°-100°-180°-200°-200°-200°-190°-170°-150° C.

The polyvinyl alcohols used were the product POLY-VIOL G40/140 (registered trade mark, Wacker) and the product GOHSENOL GH23 (registered trade mark, Nippon Gosei) in flake and powder form, respectively. The extruder was supplied with an aqueous solution of glycerine preheated to a temperature of 60° C. and including a percentage by weight of glycerine, with reference to the polyvinyl alcohol, of between about 27% and about 40%, and water, with a glycerine/water ratio of 4.3 and 1 by weight in the various examples. The extrusion was carried out at a rate of rotation of 125 RPM and with a flow rate of 50 kg/h which corresponds to a period of about 48 seconds spent in the extruder. The material in the extruder was subjected to a first mixing and transportation step in the region corresponding to the zone in which the temperature was set at 60° and 100° C. with an estimated time of about 20 seconds spent in those zones, so as to pre-plasticize the polyvinyl alcohol; in the subsequent zones, the temperature was gradually brought to a maximum of 200° C. (set temperature) and the temperature was then reduced before extrusion which was carried out at a temperature of about 160° C.; the material extruded in rod form was cooled in air.

The operative characteristics and the characteristics of the plasticized PVA, determined by DSC, are given in Table 1.

EXAMPLES 4–12

C) Formulation of thermoplastic compositions.

The plasticized polyvinyl alcohol produced by the method of each of Examples 1 to 3 was used to prepare thermoplastic compositions with ethylene-vinyl alcohol in the formulations A, B and C of Table 2, in which the individual components are indicated in parts by weight, thus producing nine thermoplastic compositions which were used to produce films by extrusion and blowing.

The thermoplastic compositions were prepared with the use of an EPV 60/36D extruder with two contrarotating, two-stage screws operating at 150 RPM, and in which the following heating profile was established: 90°-140°-175°-175°-175°-175°- 175°-165°-135° C. with a flow-rate of 80 kg/h. The water content of the composition supplied to the extruder, which was derived from the intrinsic water content of the starch used and from the solution of plasticizers, was reduced by degassing during the extrusion to obtain a water content of about 5% by weight in the extruded material.

D) Preparation of films by extrusion-blowing.

The extruded material in rod form was reduced to pellets which were used in extrusion and blowing with the use of an extruder having the following characteristics:

model: Ghioldi, having a single screw with a diameter of 40 mm and L/D of 30, screw profile: constant taper, compression ratio 1:2.8, blowing head: diameter 100 mm, decompressed distributor: spiral heating profile set: 135°-135°-140°-140°-140°-140°-145°-145° C.

The films produced by extrusion and blowing were examined optically to evaluate the presence of fused lumps and the evaluations for each film are given in Table 3.

EXAMPLES 13–16

The plasticizing method was carried out with the first mixing step being effected in a slow mixer and the second mixing step in a single-screw extruder.

A1) Mixing in a slow mixer

A BATTAGGION ME100 direct-current slow mixer was used, operating under the conditions given in Table 4.

The plasticizers used were aqueous solutions of glycerine of the percentage concentrations by weight indicated in Table 4. The plasticizers were injected by means of two atomizing injections; the second injection was effected after the first portion had been fully absorbed. It was noted that the injection of hot plasticizer gave rise to a high degree of bulking of the PVA load so as to limit the loading capacity of the mixer. The use of powdered PVA is preferable for this technique; granular PVA such as, for example, POLYVIOL G40/140 (registered trade mark, Wacker) makes it difficult for the plasticizer to penetrate and produces a wet and sticky paste, because it has less surface area in contact with the liquid. The mixing was carried out at a temperature of from 20° to 60° C. for a period of 120 minutes to produce a friable powder or a powder with small agglomerations.

The final product was then plasticized further with the use of a single-screw extruder.

B1) Single-screw plasticizing

A single-screw extruder having the following characteristics was used:

model: OMC with a screw diameter of 60 mm and an L/D of 35 screw: double metering type with degassing screw speed: 35–50 RPM heating profile set: 120°-185°-205°-205°-200°-190°-180° C.

The characteristics of the plasticized PVA produced were determined by DSC and are given in Table 5.

C1)–D1) Preparation of thermoplastic compositions and extrusion-blowing

The plasticized PVA was used to prepare thermoplastic compositions according to formulation C in Table 2, working under the conditions given in paragraph C) for Examples 4–12 and the compositions produced were used to produce films by extrusion and blowing by the method given in paragraph D) of Examples 4–12. The films produced were examined for the presence of non-fused lumps which were found to be absent or extremely rare and were not causing substantial non-homogeneity of the films produced. The evaluations are given in Table 5.

EXAMPLES 17–25

In these tests the polyvinyl alcohol was plasticized with the first mixing step being carried out in a turbomixer and the- pre-plasticized product being supplied to a single-screw extruder in order to carry out the second step.

A2) Plasticizing in a turbomixer

A 10 l direct-current Plasmec model turbomixer was used with the use of flaked POLYVIOL G40/140 (registered trade mark, Wacker) polyvinyl alcohol. The plasticizer used was glycerine mixed with water and the plasticizer was introduced by sprinkling or was atomized.

The operative conditions and the characteristics of the product obtained, determined by DSC, are given in Table 6.

B2) Single-screw plasticizing

The product obtained as a result of plasticizing in the turbomixer was supplied to a single-screw extruder having a 20 mm diameter single "metering" type screw with an L/D of 35 and a compression ratio of 1 to 3. The extrusion was carried out at a rate of rotation of 60 RPM with the following heating profile set: 150°-200°-205°-205°-180° C.

C2) Preparation of thermoplastic compositions

The plasticized PVA was used to prepare thermoplastic compositions according to the formulation C given in Examples 4–12 with the use of a single-screw extruder having a "metering" type screw with a compression ratio of 1:3, a diameter of 20 mm and an L/D of 35, operating at 60 RPM with the following heating profile set: 90°-160°-180°-140°-130° C. The plasticized polyvinyl alcohol was used in a formulation corresponding to the formulation C given in Examples 4–12.

D2) Extrusion-blowing

The thermoplastic compositions obtained in the form of pellets were used in extrusion and blowing with the use of a HAAKE extruder with a single screw having a diameter of 19.05 mm and an L/D of 25, operating at a rate of rotation of 64 RPM with a 20 mm-diameter blowing head and a blowing ratio of 4.4. Heating profile set: 140°-145°-145°-155° C.

The films obtained were examined optically to evaluate the presence of fused lumps; those present, however, had very small dimensions of between 0.1 and 0.5 mm and were such as to have only a slight adverse affect on the mechanical characteristics of the films produced. The characteristics relating to the films obtained according to examples 17–25 are given in Table 7, together with the results of the analysis of the fused lumps present, determined by DSC.

EXAMPLES 26–34 (COMPARATIVE)

The plasticized PVA obtained as a result of plasticizing in a turbomixer according to Examples 17–25 was used directly to produce thermoplastic compositions which were then transformed into films by the methods C2) and D2) described in connection with Examples 17–25. The films produced were evaluated for the presence of non-fused lumps and very many non-fused lumps with dimensions of up to 3 mm were found; the number of non-fused lumps of polyvinyl alcohol present in all the tests was such as to have an adverse effect on the characteristics of the films which were in any case of very poor quality and unacceptable.

TABLE 1

| | PLASTICIZATION OF PVA IN A DOUBLE-SCREW EXTRUDER | | |
|---|---|---|---|
| Example | 1 | 2 | 3 |
| PVA: type | POLYVIOL G40/140 | POLYVIOL G40/140 | POLYVIOL GH23 |
| concentration PVA (%) | 67 | 65 | 65 |
| GLYCERINE % | 26.8 | 17.5 | 17.5 |
| WATER | 6.2 | 17.5 | 17.5 |
| CHARACTERISTICS OF PLASTICIZED PVA GRANULES | | | |
| $T_m$ °C. | 148 | 120 | 120 |
| $\Delta H_m$ J/g | 16 | 12 | 8 |
| Tc °C. | 76 | 43 | 50 |
| $\Delta Hc$ J/g | −12 | −5 | −7 |
| residual $H_2O$ % | n.d. | 8–12 | n.d. |

TABLE 1-continued

PLASTICIZATION OF PVA IN A DOUBLE-SCREW EXTRUDER

| Example | 1 | 2 | 3 |
|---|---|---|---| n.d.: not determined
$T_m$: melting point
$T_c$: crystallisation point

TABLE 2

THERMOPLASTIC COMPOSITIONS (EXAMPLES 4–12)

|  | A | B | C |
|---|---|---|---|
| GLOBE STARCH (CERESTAR) ($H_2O$ CONTENT 10% by weight) | 38 | 36 | 36 |
| EVOH (1) | 26 | 26 | 26 |
| UREA | 4.5 | 4.5 | 5 |
| PLASTICIZED PVA (examples 1–3) | 10.4 | 10.4 | 10.4 |
| PLASTICIZERS | 13 (2) | 15 (3) | 17 (4) |

(1) ethylene-vinyl alcohol 44% by weight ethylene
(2) 81.2% by weight glycerine, 18.8% by weight $H_2O$
(3) 100% glycerine
(4) sorbitol ethoxylate 11.2% by weight
$H_2O$ 3.74% by weight
glycerine 2.04% by weight

TABLE 3

QUALITY OF THE FILM BY PRESENCE OF NON-FUSED LUMPS (EXAMPLES 4–12)

|  | Ex. | | |
|---|---|---|---|
| formul. | 1 | 2 | 3 |
| A | good | very good | very good |
| B | good | very good | very good |
| C | good | very good | very good |

Legend: Evaluations of the films on the basis of the number of non-fused lumps per $m^2$ of film and their dimensions.
Film very good: fewer than 100 non-fused lumps all smaller than 0.1 mm
Film good: between 1 and 10 non-fused lumps of between 0.5 and 0.1 mm
between 100 and 150 non-fused lumps smaller than 0.1 mm
Film fair: fewer than 5 non-fused lumps of between 0.5 and 1.5 mm
more than 10 non-fused lumps of between 0.5 and 0.1 mm
Film unacceptable: presence of non-fused lumps of between 1 and 1.5 mm
Film very poor: non-fused lumps larger than 1.5 mm.

TABLE 4

PLASTICIZATION IN A SLOW MIXER AND A SINGLE-SCREW EXTRUDER (EXAMPLES 13–16)

| EXAMPLE | 13 | 14 | 15 | 16 |
|---|---|---|---|---|
| PVA: type | GOHSENOL GH 17 | | | |
| % by weight | 70 | 70 | 60 | 64 |
| glycerine % by weight | 15 | 15 | 20 | 18 |
| water % by weight | 15 | 15 | 20 | 18 |
| plasicizing T °C. | 20 | 60 | 20 | 60 |
| chamber T °C. | 20 | 60 | 20 | 60 |
| Final product: appearance | F.P. | small/medium AGGL | F.P. | small/medium AGGL |
| apparent density g/cm³ | 0.52 | 0.4 | 0.38 | 0.30 |

F.P. = friable powder
AGGL = agglomerations

TABLE 5

CHARACTERISTICS OF PVA PLASTICIZED IN A SLOW MIXER AND A SINGLE-SCREW EXTRUDER AND EVALUATION OF THE FILMS

| Example | 13 | 14 | 15 | 16 |
|---|---|---|---|---|
| $T_m$ (°C.) | 147 | 154 | 133 | 145 |
| $\Delta H_m$ (J/g) | 18 | 19 | 60 | 80 |
| Tc (°C.) | 85 | 89 | 60 | 80 |
| $\Delta H_c$ (J/g) | −15 | −17 | −7 | −14 |
| Residual $H_2O$ | 4.1 | 3.4 | 7.3 | 5.2 |
| Colour | Trasp./grey | Trasp./yellow | Trasp./grey | Trasp./yellow |
| evaluation of the film | good | good | very good | very good |

TABLE 6

PLASTICIZATION IN A TURBOMIXER (EXAMPLES 17–25)

| Example | glycerine (% by weight) | water (% by weight) | speed of blades (rpm) | final physical condition | DSC Analysis | | | |
|---|---|---|---|---|---|---|---|---|
| | | | | | $T_m$ (°C.) | $H_m$ J/g | Tc (°C.) | $H_c$ J/g |
| 17 | 11.25 | 3.75 | 1600 | F.P. | — | — | — | — |
| 18 | 15 | 5 | " | F.P. | 155 | 45 | 72 | −12 |
| 19 | 18.75 | 6.25 | " | AGGL | 159 | 32 | 75 | −13 |
| 20 | 22.5 | 7.5 | " | AGGL | 131 | 30 | 57 | −8 |
| 21 | 26.25 | 8.75 | " | AGGL | 120 | 18 | 44 | −6 |
| 22 | 17.5 | 2.5 | " | F.P. | — | — | — | — |
| 23 | 15 | 5 | " | F.P. | — | — | — | — |
| 24 | 12.5 | 7.5 | " | F.P. | — | — | — | — |
| 25 | 10 | 10 | " | S.AGGL | — | — | — | — |

AGGL = agglomerated
S.AGGL = slightly agglomerated
F.P. = friable powder

TABLE 7

EVALUATION OF THE FILMS OF PVA PLASTICIZED IN A TURBOMIXER WITH A SINGLE-SCREW EXTRUDER

| Examples | Evaluation of the film | Analysis of fused lumps | | | |
|---|---|---|---|---|---|
| | | $T_m$ (°C.) | $\Delta H_m$ J/g | Tc °C. | $H_c$ J/g |
| 17 | fair | 129 | 12 | 86 | −12 |
| 18 | fair | — | — | — | — |
| 19 | fair | — | — | — | — |
| 20 | good | 128 | 9.7 | 86 | −6 |
| 21 | very good | 127 | 15 | 84 | −10 |
| 22 | fair | 131 | 13 | 87 | −7 |
| 23 | fair | 127 | 13 | 85 | −12 |
| 24 | fair | 130 | 6.6 | 113 | −13 |
| 25 | fair | 129 | 12 | 88 | −8 |

What is claimed is:

1. A method of producing biodegradable polymeric blends comprising starch, at least a synthetic thermoplastic polymer, which is substantially insoluble in water, polyvinyl alcohol and plasticizer, said method comprising mixing said starch, at least a synthetic thermoplastic polymer, polyvinyl alcohol and plasticizer components in the presence of an amount of water from 5% to 40% by wt., referring to the sum of added water and water of the starch-water system, under temperature and pressure conditions such as to form a thermoplastic melt, wherein the polyvinyl alcohol used in the mixing of said components is a pre-plasticized polyvinyl alcohol produced in the absence of said starch component according to a process comprising the steps of:
  i) pre-plasticizing the polyvinyl alcohol at a maximum temperature no higher than its softening point in the presence of an organic plasticizer and in the presence of a quantity of water which is insufficient to dissolve the polyvinyl alcohol under normal conditions, so as to produce a pre-plasticized polyvinyl alcohol having a melting point below the softening point of the polyvinyl alcohol used, wherein said pre-plasticizing step is carried out:
    a) under extrusion conditions at a temperature above 60° C. and not higher than 140° C., or
    b) under the mixing conditions of a slow mixer, or of a turbomixer at a temperature above 20° C. and not higher than 140° C., and
  ii) further processing, under extrusion conditions, the pre-plasticized polyvinyl alcohol of step i) at a temperature above its melting point under shear-stress conditions and for a period of time which is sufficient to produce a substantially homogeneous melt.

2. A method for preparing a polymeric composition comprising polyvinyl alcohol and starch, said method comprising forming a thermoplastic melt by mixing said starch, polyvinyl alcohol and other polymeric composition components under conditions such that a thermoplastic melt is formed, wherein the polyvinyl alcohol used in the mixing of said components comprises a pre-plasticized polyvinyl alcohol produced in the absence of said starch component according to a process comprising the steps of:
  i) pre-plasticizing the polyvinyl alcohol at a maximum temperature no higher than its softening point in the presence of an organic plasticizer and in the presence of a quantity of water which is insufficient to dissolve the polyvinyl alcohol under normal conditions, so as to produce a pre-plasticized polyvinyl alcohol having a melting point below the softening point of the polyvinyl alcohol used, wherein said pre-plasticizing step is carried out:
    a) under extrusion conditions at a temperature above 60° C. and not higher than 140° C., or
    b) under the mixing conditions of a slow mixer, or of a turbomixer at a temperature above 20° C. and not higher than 140° C., and
  ii) further processing, under extrusion conditions, the pre-plasticized polyvinyl alcohol of step i) at a temperature above its melting point under shear-stress conditions and for a period of time which is sufficient to produce a substantially homogeneous melt.

3. A method according to claim 1, wherein the synthetic thermoplastic polymer is a polymer of at least one ethylenically unsaturated monomer, the polymer including repeating units having at least one polar group selected from the group consisting of hydroxy, alkoxy, carboxy, carboxyalkyl, alkylcarboxy and acetal groups.

4. A method according to claim 3, wherein the synthetic thermoplastic polymer is a copolymer of an olefin selected from the group consisting of ethylene, propylene, isobutene and styrene with acrylic acid, vinyl alcohol or vinyl acetate.

5. A method according to claim 4, wherein the synthetic thermoplastic polymer is an olefinic copolymer selected from the group consisting of ethylene-vinyl alcohol having an ethylene content of from 10 to 44% by weight and a degree of hydrolysis of from 50 to 100%, ethylene-acrylic acid and mixtures thereof.

6. A method according to claim 1, wherein the synthetic polymer comprises a group selected from epsilon-caprolactone, or copolymers of epsilon-captolactone, polyhydroxybutyrate, polyhydroxybutyrate/valerate, polymers of lactic acids, and polymers of glycolic acid.

7. A method according to claim 1, wherein the biodegradable polymeric mixture comprises:

from 20 to 70% by weight of starch, from 10 to 50 % by Weight of total synthetic thermoplastic polymer, and from 5 to 25% by weight of an organic plasticiser.

8. A method according to claim 7, wherein the synthetic polymer is from 10 to 50% by weight of polyvinyl alcohol.

* * * * *